(12) United States Patent
Yamaguchi et al.

(10) Patent No.: US 7,668,410 B2
(45) Date of Patent: Feb. 23, 2010

(54) PRODUCTION METHOD FOR POLARIZATION INVERSION UNIT

(75) Inventors: Shoichiro Yamaguchi, Ichinomiya (JP); Yuichi Iwata, Nagoya (JP); Kengo Suzuki, Nagoya (JP)

(73) Assignees: NGK Insulators, Ltd., Nagoya (JP); NGK Optoceramics Co., Ltd., Komaki (JP)

( * ) Notice: Subject to any disclaimer, the term of this patent is extended or adjusted under 35 U.S.C. 154(b) by 0 days.

(21) Appl. No.: 11/636,232

(22) Filed: Dec. 8, 2006

(65) Prior Publication Data

US 2007/0092979 A1    Apr. 26, 2007

Related U.S. Application Data

(63) Continuation of application No. PCT/JP2005/006981, filed on Apr. 4, 2005.

(30) Foreign Application Priority Data

Jun. 16, 2004    (JP)    ............... JP2004-177843

(51) Int. Cl.
*G02B 6/00* (2006.01)
*G02F 2/02* (2006.01)

(52) U.S. Cl. ................... 385/11; 385/122; 359/328

(58) Field of Classification Search ............... None
See application file for complete search history.

(56) References Cited

U.S. PATENT DOCUMENTS 6,002,515 A    12/1999    Mizuuchi et al.

| | | | |
|---|---|---|---|
| 6,731,422 B2 * | 5/2004 | Yamaguchi et al. | ......... 359/332 |
| 2003/0179439 A1 | 9/2003 | Lin et al. | |
| 2006/0158061 A1* | 7/2006 | Hauser et al. | ........... 310/313 B |

FOREIGN PATENT DOCUMENTS

| GB | 2185123 A | * | 7/1987 |
|---|---|---|---|
| JP | 11-072809 A1 | | 3/1999 |
| JP | 2002-277915 A | | 9/2002 |
| JP | 2003-057700 A1 | | 2/2003 |
| JP | 2003-307757 A1 | | 10/2003 |
| JP | 2003-307758 A1 | | 10/2003 |

* cited by examiner

*Primary Examiner*—Omar Rojas
(74) *Attorney, Agent, or Firm*—Burr & Brown (57) ABSTRACT

It is provided a novel method of producing polarization inversion parts by electric field polling process wherein the polarization inversion part extends to a deeper point from the surface of a substrate. The polarization inversion part is produced by electric field polling process using a comb electrode having a plurality of electrode portions 5 and a feeding portion 1. Each electrode portion 5 has a base portion 6 extending from the feeding portion 1 and a plurality of conductive portions 5a, 5b and 5c separated from the base portions 6, and the conductive portions have an average length "d" of 4 μm or longer and 9 μm or shorter. Alternatively, each electrode portion 5 has a base portion 6 extending from the feeding portion 1 and a plurality of conductive portions 5a, 5b and 5c separated from the base portion 6, and the conductive portion 5b at the tip end of the electrode portion has a length "db" smaller than the length "da" of the conductive portion 5b nearest to the base portion.

3 Claims, 10 Drawing Sheets
(3 of 10 Drawing Sheet(s) Filed in Color)

PRODUCTION METHOD FOR POLARIZATION INVERSION UNIT

BACKGROUND OF THE INVENTION

1. Field of the Invention

The invention relates to a method of producing polarization inversion parts by means of an electric field poling process.

2. Related Art Statement

A second harmonic generation device based on a quasi-phase-matching system has a ferroelectric single crystal, such as lithium niobate or lithium tantalite single crystal, with periodic polarization inversion structure formed therein. The device can generate light of selectable wavelengths in a range from ultraviolet to infrared ray. Such device can be applied in various fields including an optical disk memory, medical, opto-chemical and various kinds of optical measurement uses.

It is necessary to form deep polarization inversion structure in a ferroelectric single crystal, for attaining a high conversion efficiency in a second harmonic wave generation device. According to the method described in Japanese Patent publication No. H11-72809A, the surface of a substrate of a ferroelectric single crystal is inclined with respect to the polarization axis of the crystal by 3° and a comb electrode and rod-shaped electrode are formed on the surface of the substrate. Several low resistance portions are formed between the tip end of each electrode piece of the comb electrode and the rod-shaped electrode. Direct current voltage is then applied on the comb and rod-shaped electrodes, so that polarization inversion parts are formed corresponding with the electrode pieces of the comb electrode as well as the low resistance portions, as shown in FIG. 28 of H11-72809A. Specifically, it is described that the length of the low resistance portion may preferably be 10 to 30 µm and may be 20 µm, for example.

DISCLOSURE OF THE INVENTION

According to the method described in Japanese patent Publication No. H11-72809A, the polarization inversion parts are formed corresponding with the electrode pieces of the comb electrode, and it is also possible to form polarization inversion parts corresponding with the low-resistance portions, respectively. However, a predetermined gap is provided between the tip end of the electrode piece of the comb electrode and each low resistance portion, and gaps are further provided between the adjacent low resistance portions. Gaps are thus formed between the corresponding polarization inversion parts. The polarization inversion parts are formed at positions that are distant from each other. When the above described pattern for a periodic polarization inversion structure is applied to the second harmonic wave generating device employing to pseudo phase matching system, only the polarization inversion part at a specific position that corresponds to the position of an optical waveguide would overlap the fundamental wave in most cases (that is, in the case where a polarization inversion part is positioned at the center of the optical waveguide, the adjacent polarization inversion part would be outside of the waveguide). It is thus considered that the efficiency of the second harmonic wave generation is not particularly improved.

Further, in the case that the length of the electrode portions are larger than 4 µm, a deep inversion structure can be easily obtained. On the contrary, in a region where the length of the electrode portions are 4 µm or smaller, adjacent polarization inversion parts tend to be connected with each other, resulting in deteriorated periodicity where a deeper polarization inversion structure is formed. As a result, the wavelength conversion rate may be lowered.

An object of the present invention is to provide a novel method of forming polarization inversion parts by an electric field polling process where the polarization inversion parts are extended to a deep position under of the surface of a substrate.

A first aspect of the present invention provides a method of producing a polarization inversion part by an electric field polling process using a comb electrode having a plurality of electrode portions and a feeding portion provided on one surface of a substrate of ferroelectric single crystal and of single domain. Each electrode portion has a base portion extending from the feeding portion and a plurality of conductive portions separated from the base portion. The conductive portions has an average length of 4 µm or longer and 9 µm or shorter.

A second aspect of the present invention provides a method of producing a polarization inversion part by an electric field polling process using a comb electrode having a plurality of electrode portions and a feeding portion provided on one surface of a substrate of ferroelectric single crystal and of single domain. Each electrode portion comprises a base portion extending from the feeding portion and a plurality of conductive portions separated from the base portion, and the conductive portion at the tip end of the electrode portion has a length smaller than the length of said conductive portion nearest to the base portion.

A third aspect of the present invention provides a method of producing a polarization inversion part by an electric field polling process using a comb electrode having a plurality of electrode portions and a feeding portion provided on one surface of a substrate of ferroelectric single crystal and of single domain. Each electrode portion comprises a base portion extending from the feeding portion and a plurality of conductive portions separated from the base portion, and the adjacent conductive portions are separated by a gap of 0.5 µm or more and 5.0 µm or less.

The present inventors have found that, when a plurality of conductive films which are separated from each other, are provided for forming a comb electrode, the construction of the conductive films have considerable influence on the state of the thus formed polarization inversion parts.

Specifically, the polarization inversion parts that extend from the respective conductive portions tend to be connected with each other and a periodic polarization inversion structure of a shorter period can be easily formed, by lowering the average length of the conductive portions to 9 µm or smaller. For example it a deeper periodic polarization inversion structure with a shorter period, such as 1.8 µm or 1.3 µm, which had not been obtained according to a prior process, could be successfully obtained. More preferably, the average length of the conductive portions may be 5 µm or smaller.

However, when the average length of the conductive portions would be less than 4 µm, the polarization inversion part corresponding to some conductive portions would not be generated. The average length of the conductive portions is thus made 4 µm or more.

Further, the inventors have found the following. When a plurality of conductive films separated from each other are provided for forming a comb electrode, the length "db" of the conductive portion at the tip end of the electrode portion is made smaller than the length "da" of the conductive portion nearest to the base portion. The polarization inversion parts extending from the respective conductive portions thereby tend to be connected with each other and a periodic polarization inversion structure of a shorter period can be easily formed.

On the viewpoint of the present invention, the difference between the length of "da" and "db" may preferably be 10 μm or larger and more preferably be 5 μm or larger. Further, the length of "da" may preferably be 5 μm or smaller and the length of "db" may preferably be 20 μm or smaller. Further, the difference between the length of "da" and "db" may preferably be 4 μm or larger.

Further, the inventors have found the following. When a plurality of conductive films separated from each other are provided for forming a comb electrode, the gap between the adjacent conductive portions are made 0.5 μm or larger and 5 μm or smaller. The polarization inversion parts extending from the respective conductive portions thereby tend to be connected with each other and a periodic polarization inversion structure of a shorter period can be easily formed.

More specifically, the gap between the conductive portions may preferably be 4 μm or smaller and more preferably be 2 μm or smaller. However, when the gap between the conductive portions becomes too small, it tends to be rather difficult to form a deep polarization inversion part. The minimum gap between the conductive portions may thus be 0.5 μm and more preferably be 1 μm.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

PREFERRED EMBODIMENTS OF THE INVENTION

The kind of a ferroelectric single crystal forming the substrate 2 of a ferroelectric single crystal is not particularly limited. The material may preferably be lithium niobate ($LiNbO_3$), lithium tantalite ($LiTaO_3$), a solid solution of lithium niobate-lithium tantalate, or $K_3Li_2Nb_5O_{15}$.

The ferroelectric single crystal may contain one or more metal element(s) selected from the group consisting of magnesium (Mg), zinc (Zn), scandium (Sc) and indium (In) for further improving the resistance against optical damage of a three-dimensional optical waveguide formed therein. Magnesium is particularly preferred.

The ferroelectric single crystal may contain a rare earth element as a dopant. The rare earth element is capable of acting as an additive for laser oscillation. The rare earth element may preferably be Nd, Er, Tm, Ho, Dy or Pr.

A so-called "off-cut" substrate may be used, so that a deeper polarization inversion structure can be obtained, compared with that obtained using a non-offset x-cut or y-cut substrate. When the off-cut angle is as small as about 5°, it is possible to reduce a degradation of efficiency due to mismatch of plane of polarization and to perform the wavelength conversion at a high efficiency, normally without the need to adjust the optical axis with that of a semiconductor laser emitting at TE mode and the angle corresponding with the off-cut angle. However, as the off-cut angle becomes larger, a degradation of the efficiency due to the mismatch of the plane of polarization is increased. In such case, it is necessary to adjust the angle so that the mismatch of the plane of polarization is reduced.

The off-cut angle is not particularly limited. The angle is preferably be 1° or more, or 20° or less.

Further, a so-called X-cut substrate, Y-cut substrate or Z-cut substrate may be used. When X-cut substrate or Y-cut substrate is used, the uniform electrode may be provided on one surface other than the back face so that a voltage may be applied on the comb and uniform electrodes. In this case, the opposing electrode may be omitted or may be left as a floating electrode. Further, in the case that a Z-cut substrate is used, the uniform electrode may be provided on the back face so that a voltage is applied on the comb and uniform electrodes. In this case, the opposing electrode is may also be omitted or may be left as a floating electrode.

Embodiments according to the first and third aspects of the present invention will be described below, referring to FIGS. 1 to 3.

Figure 1:
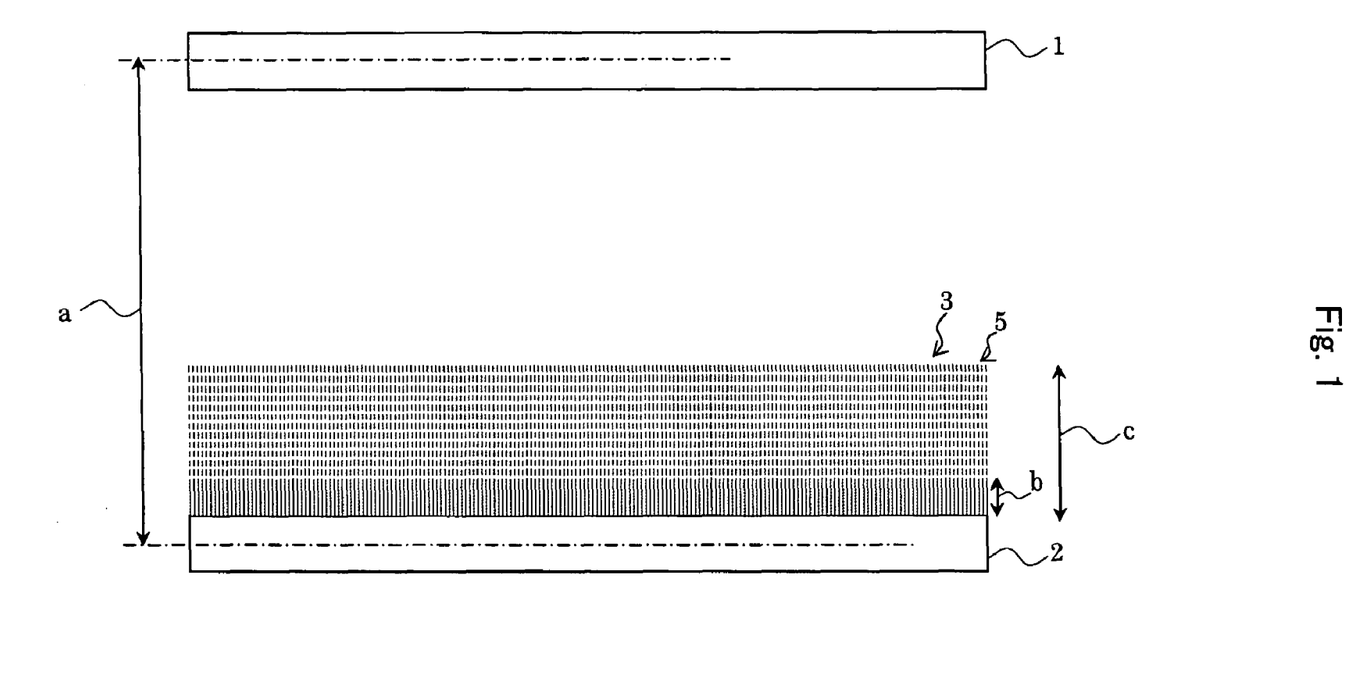
FIG. 1 is a plan view schematically showing a comb electrode 3 and an opposing electrode 1 according to the first and third aspects of the present invention.

FIG. 1 is a plan view showing pattern of electrodes provided on a substrate. FIG. 2 is an enlarged view showing planar pattern of an electrode portion of the comb electrode shown in FIG. 1. FIG. 3 is a perspective view schematically showing a substrate 8 with electrodes formed thereon.

When a polarization inversion part is produced, an off-cut substrate made of a ferroelectric single crystal is used as the substrate 8. The polarization axis "A" of the ferroelectric single crystal is inclined with respect to a surface 8a and back face 8b at a specific angle, such as 5°, so that the substrate 8 is called as "off-cut substrate".

A comb electrode 3 and an opposing electrode 1 are formed on the surface 8a of the substrate 8, and a uniform electrode 9 is formed on the back face 8b. The comb electrode 3 has many elongated electrode portions 5 arranged at a specific interval and an elongate feeding portion 2 connecting the roots of many electrode portions 5. The opposing electrode 1 is made of an elongate electrode piece and provided so that the opposing electrode opposes the tip ends of the electrode portions 5.

First, the whole of the substrate 8 is polarized in the direction "A" of non-polarization inversion. A voltage "V1" is then applied on the comb electrode 3 and opposing electrode 1, and a voltage "V2" is applied on the comb electrode 3 and uniform electrode 9. Polarization inversion parts are gradually generated from the respective electrode portions 5 in a direction "B". The direction "B" of polarization inversion is opposite to the direction "A" of non-polarization inversion.

Besides, the non-polarization inversion parts are left in gaps between the adjacent polarization inversion parts, which do not correspond with the electrode portions. It is thereby produced a periodic polarization inversion structure having polarization inversion parts and non-polarization inversion parts arranged alternately. An optical waveguide can be formed at a position where the periodic polarization inversion structure is formed.

Figure 2:
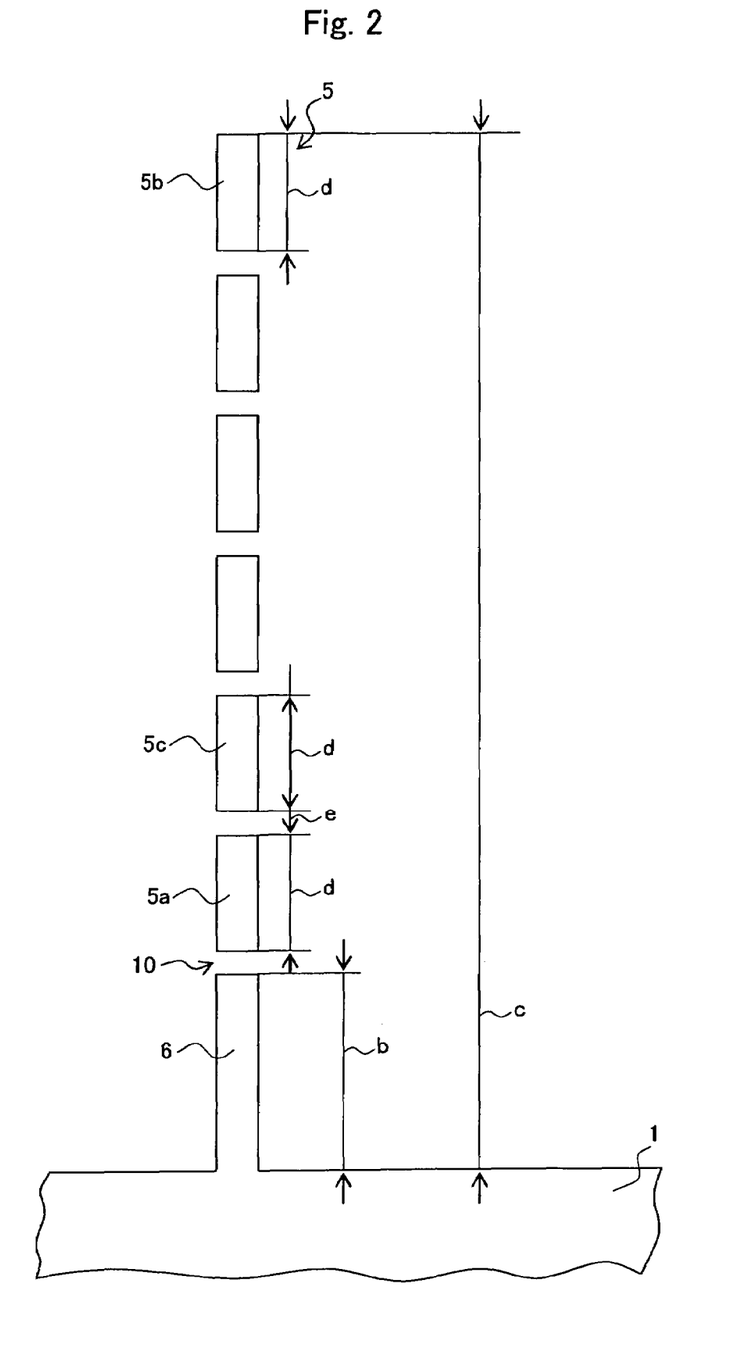
FIG. 2 is a plan view showing a shape of an electrode portion 5.

According to the present example, particularly as shown in FIG. 2, each electrode portion 5 has a base portion 6 extending from a feeding portion 2, and a plurality of conductive portions 5a, 5b and 5c separated from the base portion 6. The average length of the conductive portions 5a, 5b and 5c is 4 µm or longer and 9 µm or shorter. That is, 5a represents the conductive portion nearest to the base portion 6, 5b represents the conductive portion at the tip end and 5c represents the conductive portion between 5a and 5b. The lengths of the conductive portions are added to obtain a total, which is then divided by a number of the conductive portions to calculate the average length "d" of the conductive portions.

Further, according to the present example, the dimension "e" of the adjacent conductive portions 10 is made 0.5 µm or more and 5.0 µm or less.

Embodiments according to the second and third aspects of the present invention will be described below, referring to FIGS. 2, 4 and 5.

Figure 4:
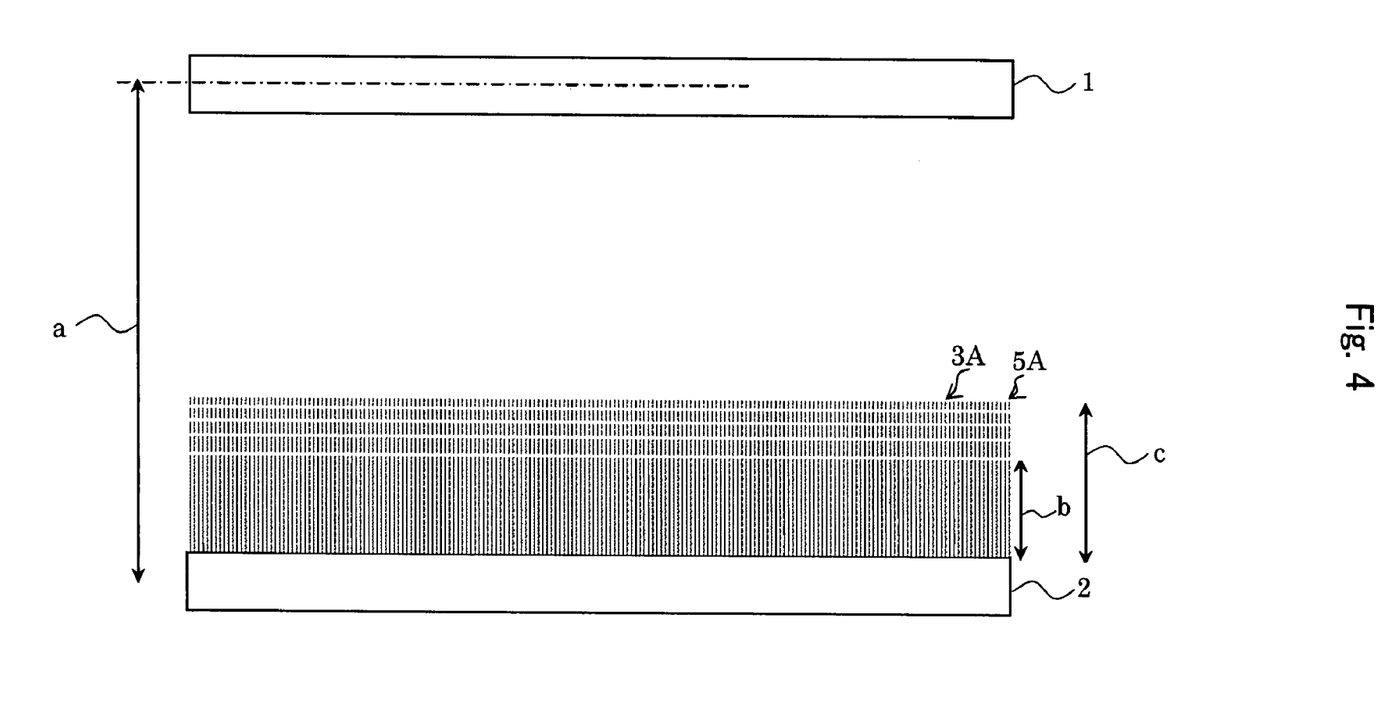
FIG. 4 is a plan view schematically showing a comb electrode 3 and an opposing electrode 1 according to the second and third aspects of the present invention.

FIG. 4 is a plan view showing pattern of electrodes provided on a substrate. FIG. 5 is an enlarged view showing a planar pattern of an electrode portion of a comb electrode shown in FIG. 4.

A comb electrode 3A and an opposing electrode 1 are formed on the surface 8a, and a uniform electrode 9 is formed on the back face 8b of a substrate 8. The comb electrode 3A has many elongated electrode portions 5A arranged at a specific interval and an elongate feeding portion 2 connecting the roots of many electrode portions 5A. The opposing electrode 1 is made of an elongate electrode piece and provided so that the opposing electrode opposes the tip ends of the electrode portions 5A.

First, the whole of the substrate 8 is polarized in the direction "A" of non-polarization inversion. A voltage "V1" is then applied on the comb electrode 3A and opposing electrode 1, and a voltage "V2" is applied on the comb electrode 3A and uniform electrode 9. Polarization inversion parts are gradually generated from the respective electrode portions 5A in a direction "B". The direction "B" of polarization inversion is opposite to the direction "A" of non-polarization inversion.

Figure 5:
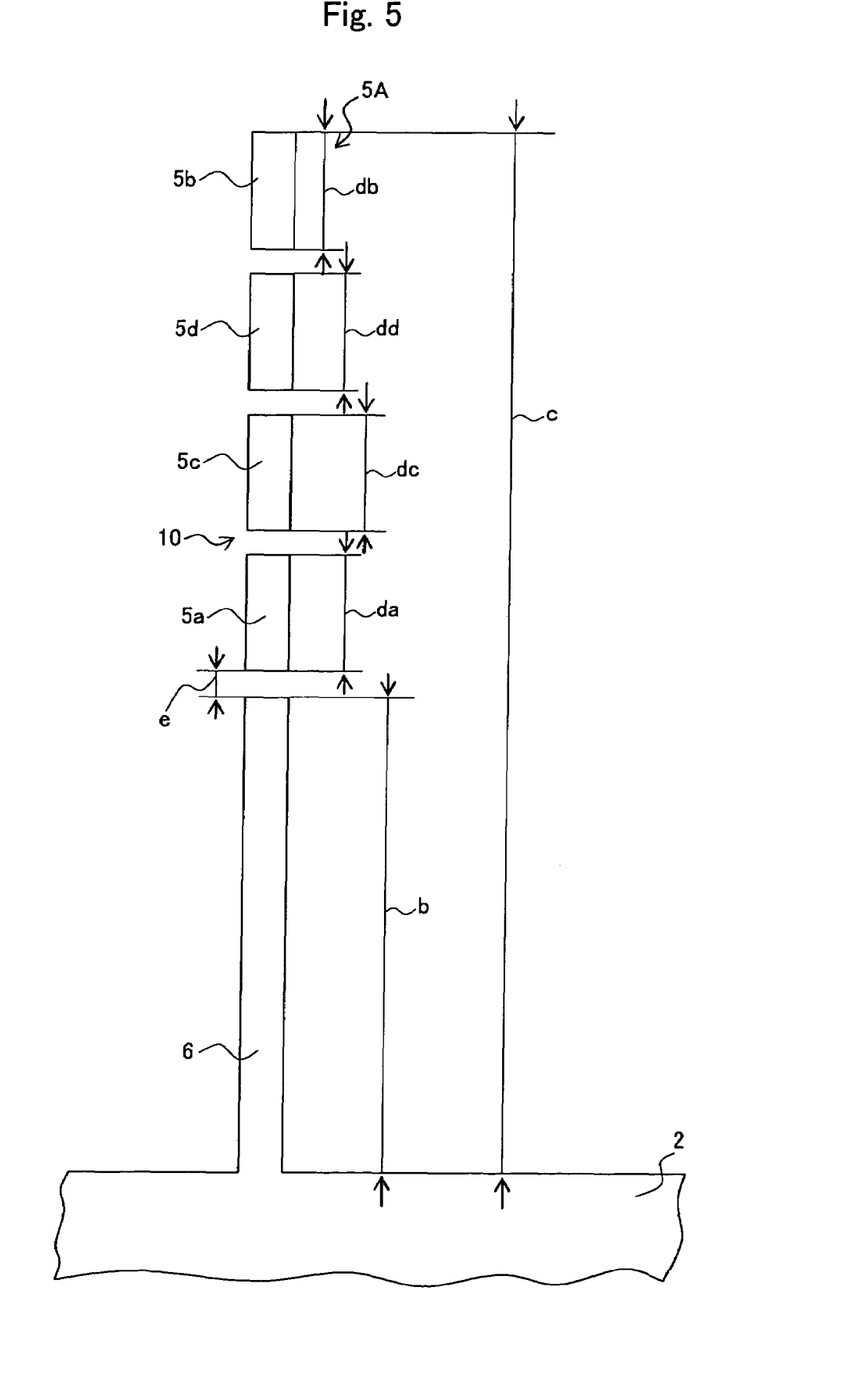
FIG. 5 is a plan view showing a shape of an electrode portion 5A.

According to the present example, particularly as shown in FIG. 5, each electrode portion 5A has a base portion 6 extending from a feeding portion 2, and a plurality of conductive portions 5a, 5b, 5c and 5d separated from the base portion 6. According to the second aspect, the length "da" of the conductive portion 5a nearest to the base portion 6 is made larger than the length "db" of the conductive portion 5b at the tip end. At the same time, according to the third aspect, the dimension "e" of the gap 10 between the adjacent conductive portions is made 0.5 µm or more and 5.0 µm or less.

According to the second aspect of the present invention, a difference between the length "da" of the conductive portion 5a nearest to the base portion 6 and the length "db" of the conductive portion 5b at the tip end may preferably be 10 µm or larger and more preferably be 5 µm or larger. Further, although the length "dc" or "dd" of the conductive portion between the conductive portion nearest to the base portion 6 and at the tip end is not limited, "da" may preferably be 5 µm or larger and "db" may preferably be 20 µm or smaller. In this case, "dc" and "dd" may be equal to "da" or "db" or may be between "da" and "db". More preferably, the length of the conductive portion is decreased stepwise from the base portion 6 towards the tip end.

According to the present invention, the period of the periodic polarization inversion structure is not particularly limited. For one example, the invention is particularly suitable to that having a period of 4 µm or shorter.

The number of the gaps 10 between the conductive portions is not particularly limited, and may be 3 to 15, for example.

EXAMPLES

Experiment "a" According to the First and Third Aspect of the Invention

Figure 3:
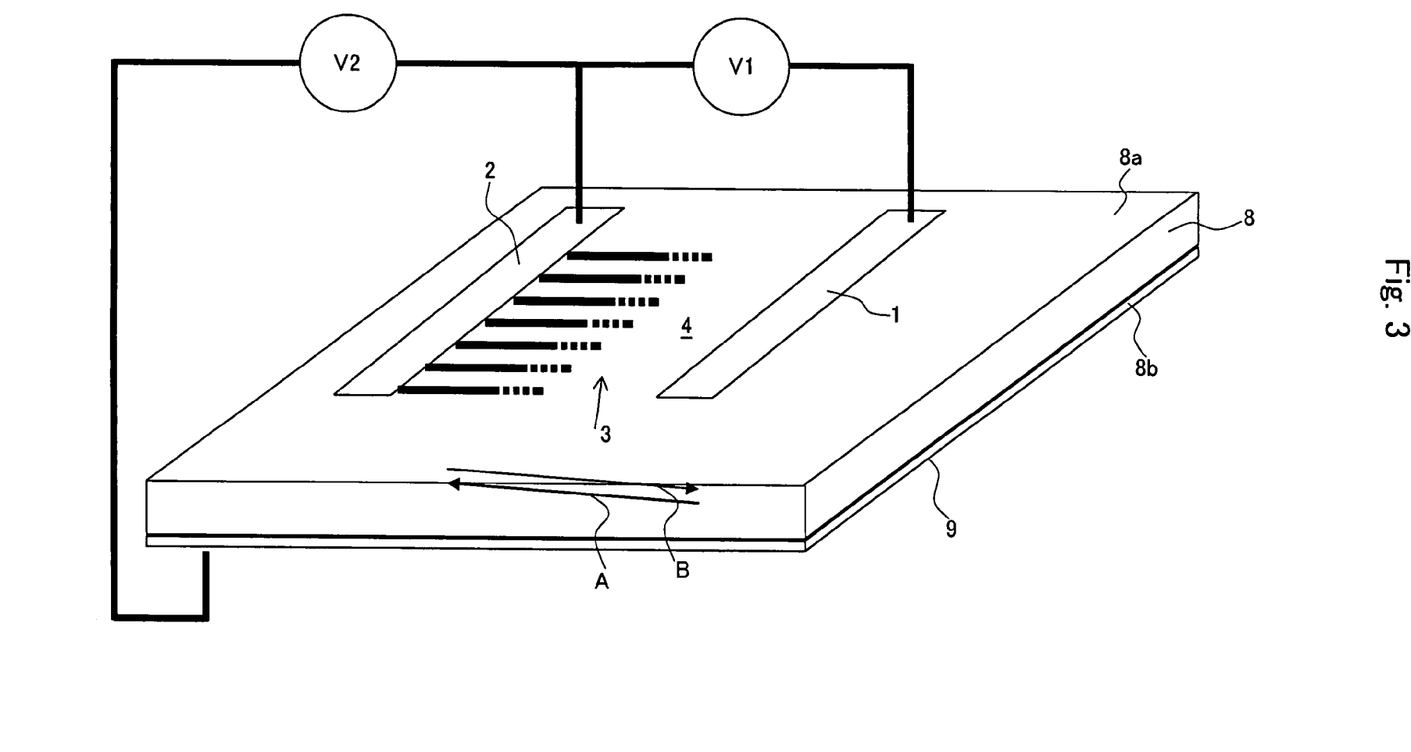
FIG. 3 is a perspective view schematically showing a substrate with a comb electrode 3, an opposing electrode 1 and a uniform electrode 9, which are used to form a periodic polarization inversion structure by electric field polling process.

Periodic polarization inversion structure was formed by an electric field polling process, according to the process described referring to FIGS. 1 to 3. The dimension "e" of the gap 10 of the conductive portions was made 10 µm, and the length of each of the conductive portions 5a, 5b and 5c was made 8 µm. The base portion 6 longer than the conductive portion was provided at the root of the electrode portion 5 for facilitating the electric supply to the electrode piece. The distance "a" between the centers of the opposing electrode 1 and supply electrode 2 was made 400 µm. The length "b" of the base portion 6 was 33 µm.

According to Experiment "A1", the period of the periodic domain inversion was 1.8 µm. 13 conductive portions 5a, 5b and 5c were arranged each having a length "d" of 8 µm. The periodic polarization inversion structure was experimentally produced and tested as described above. The whole length "c" of the electrode portion was 150 µm.

Further, according to Experiment "A2", the length "d" of the conductive portion was 12 µm, the gap "e" was 1 µm and the number of the conductive portions was 9. The number and lengths of the conductive portions were adjusted so that the length "b" of the base portion 6 was made 33 µm same as the above case where the length of the conductive portion was 8 µm. The whole length "c" of the electrode portion was 150 µm.

Figure 6:
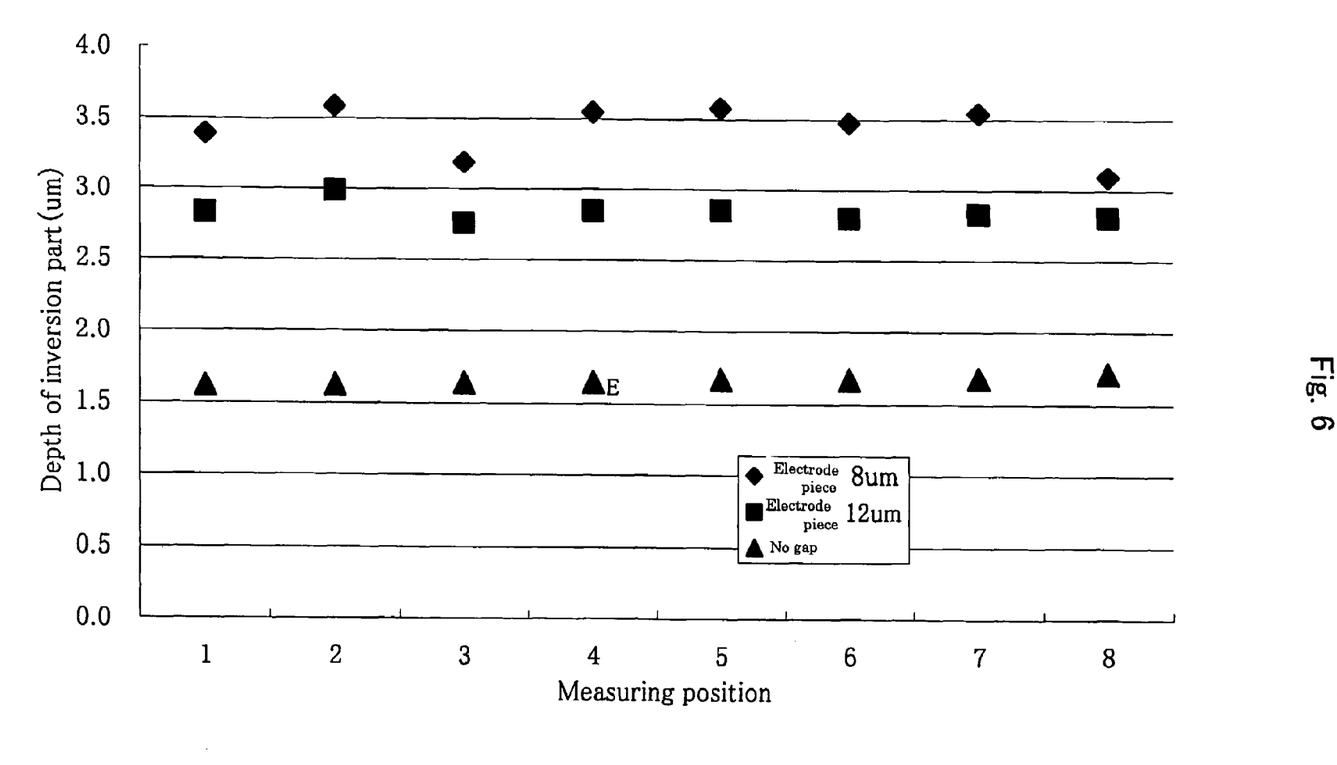
FIG. 6 is a graph showing experimental results of Experiment "A".

FIG. 6 shows the depths of the polarization inversion in the cases that the length "d" of the conductive portion was 8 µm and gap was 1 µm (Experiment "A1") and that d was 12 µm and the gap was 1 µm (experiment "A2") and that the gap 10 was not provided (Experiment "A3").

The depth of the polarization inversion will be described below. It is necessary to cut a wafer for directly measuring the depth to perform destructive measurement. For avoiding the destructive measurement, a off-y-cut substrate of an off-cut angle of 5° was used and subjected to etching using fluoric and nitric acids. The polarization inversion part observed on the wafer surface was measured for the length, which was converted to the depth. The same condition for the application of voltage was applied. Specifically, no voltage was applied on and no wiring was provided at "V1" in FIG. 2. A pulse voltage of about 4 kV was applied only on "V2". An LiNbO$_3$ substrate doped with MgO (thickness of 0.5 mm) was used, and an electric field beyond the coercive force was applied. Ta was applied on the lower and upper faces of the substrate. The voltage was applied in an insulating oil for preventing discharge.

According to the results shown in FIG. 6, it was proved that the depth of polarization inversion produced by providing the electrode with the gaps (Experiment A2) was increased to about 2 times of the depth of polarization inversion produced by providing the electrodes with no gaps (Experiment A3). It was further proved that deeper polarization inversion could be formed in the case that the length of the electrode piece was 8 µm (Experiment "A1").

Figure 7:
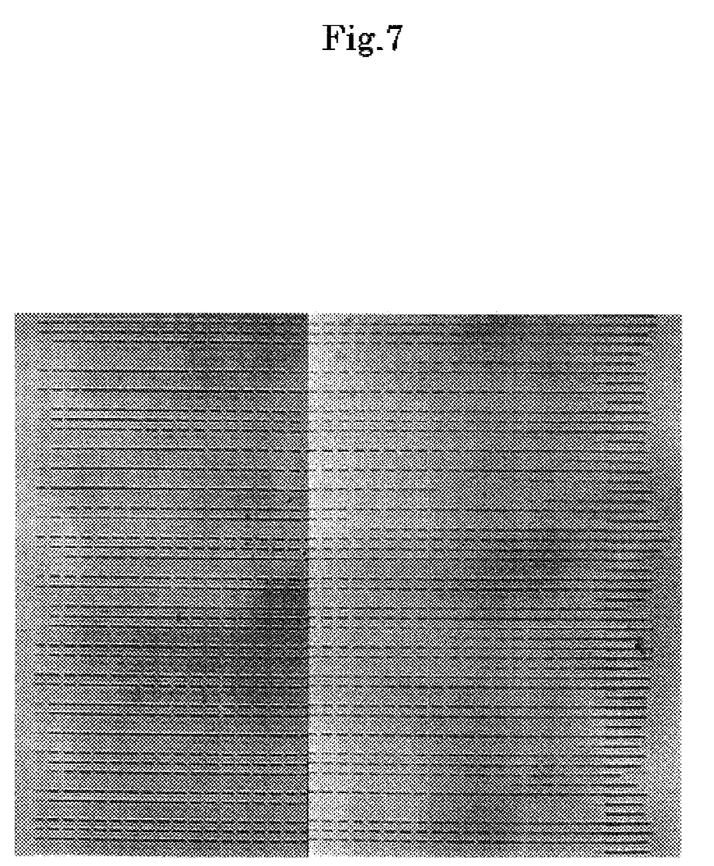
FIG. 7 is a photograph showing a shape of polarization inversion part obtained in the Experiment "A" where the length "d" of the conductive portion is made 3 μm.

It was further proved that still deeper polarization inversion can be obtained by making the length "d" of the conductive portion to 7 µm or shorter and further 5 µm or shorter. However, when the substrate was produced having the conductive portion with a length of 3 μm, the polarization inversion was not generated in some parts as shown in FIG. 7, that is, the polarization inversion was not stably formed. Such deviation was not observed in the case that the length "d" of the conductive portion was 4 μm or longer. It was thus proved that the length of the electrode piece was preferably 4 μm or longer.

Further, it was shown the results of the above experiment where the electrode portion was divided into 13 portions and the electrode length was 8 μm, that is, 13 gaps were present. However, after several times of experiments, it was proved that still deeper polarization inversion was obtained in the case that 10 gaps were present. It is, however, considered that the preferred number of the gaps depends on the length of the electrode piece and period.

Further, although the dimension of the gap was made 1 μm in the above experiment, the dimension of the gap may preferably be about 1 μm for a period less than 4 μm. It was confirmed that deeper polarization inversion can be obtained even when the gap is about 2 μm at a period of 4 μm or longer.

Figure 8:
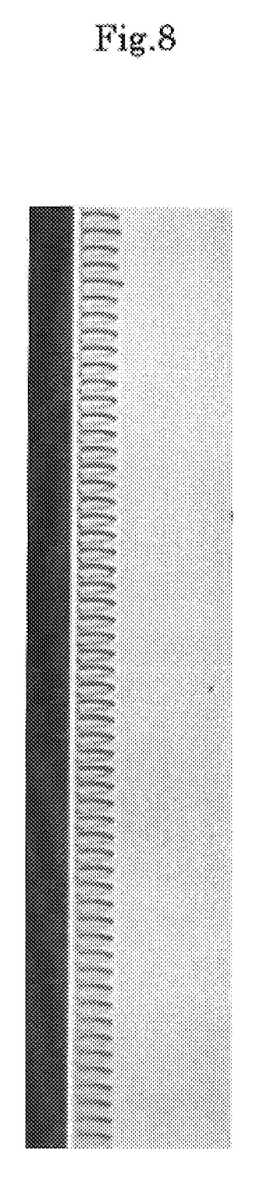
FIG. 8 is a photograph showing a shape of polarization inversion part (in a direction of the depth) obtained in Experiment "A1" of the Experiment "A".

Besides, it had been speculated that gaps may be generated in the polarization inversion parts in the case that gaps are formed in the electrode portion as shown in FIG. 1. However, after the polarization inversion part was cut at the cross section, polished and observed, it was proved that polarization inversion parts were continuously formed in the direction of depth without the gaps corresponding with the electrodes, as shown in FIG. 8.

Experiment "B" According to the Second and Third Aspects of the Present Invention A periodic polarization inversion structure was produced according to the method described referring to FIGS. 2, 4 and 5. The dimension "e" of the gap 10 of the conductive portions was made 10 μm, and the lengths of the conductive portions 6a, 5c, 5d and 5b were made 8, 10, 12 and 14 μm, respectively, from the tip end toward the base portion. A distance "a" between the centers of the opposing electrode 1 and supply electrode 2 was made 400 μm. The length "b" of the base portion 6 was 93 μm.

According to Experiment "B1", the period of the periodic polarization inversion was made 1.3 μm. As described above, it was tried to produce and test the periodic polarization inversion structure. According to experiment "B2", the gaps were not formed.

Figure 9:
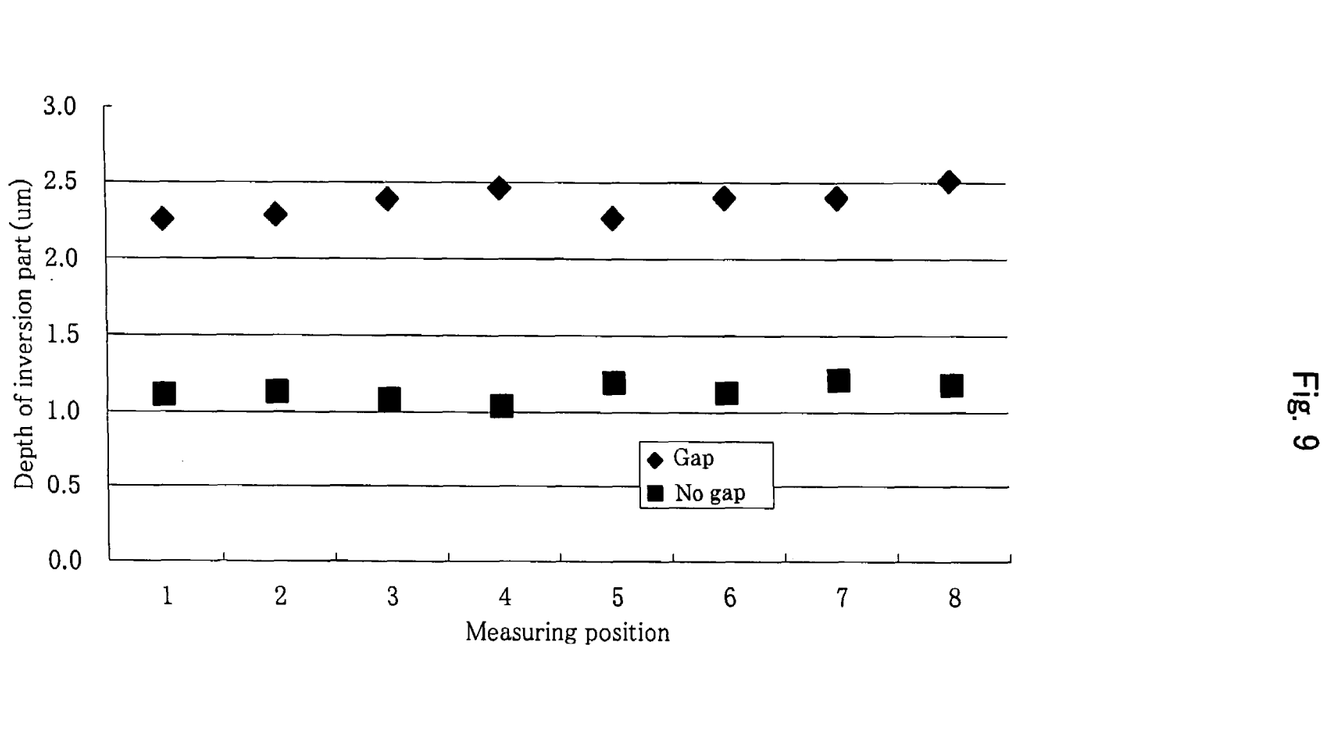
FIG. 9 is a graph showing results of the Experiment "B".

FIG. 9 shows the depth of the polarization inversion part produced using the electrode structure shown in FIGS. 2, 4 and 5 and the results obtained using the electrodes designed without the gaps for the comparison. As to the condition of applying a voltage, the voltage of "V2" was lowered so that about 2 kV of pulse voltage was applied, because the period was shorter than that in the Experiment "A".

Figure 10:
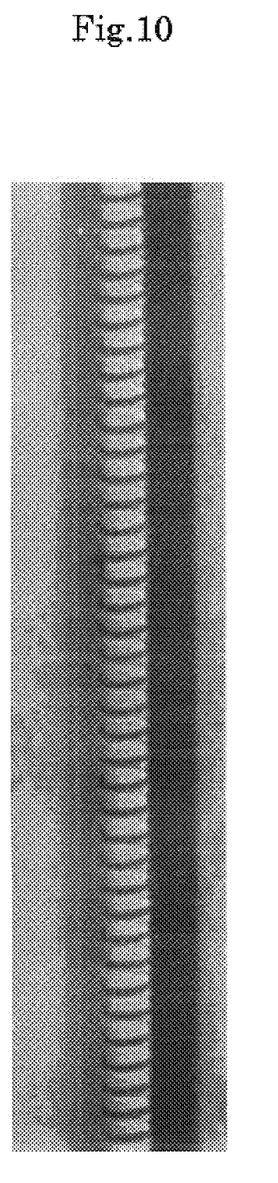
FIG. 10 is a photograph showing a shape of polarization inversion portion (in a direction of the depth) obtained in Experiment "B1" of the Experiment "B".

According to the results shown in FIG. 9, it was proved that the depth was increased twice and a deeper polarization inversion structure was obtained in the case where the gaps were formed. FIG. 10 shows the examples of the observation of cross section of the polarization inversion part obtained according to the Experiment "B1". Also in this case, it was confirmed that the polarization inversion part does not include gaps corresponding with the gaps in the electrode portion and is continuously connected in the cross section.

Further, according to Experiment "B3", it was tried to produce the polarization inversion where the lengths of the conductive portions were made 14, 12, 10 and 8 μm, respectively from the tip end toward the base portion. As a result, the adjacent polarization inversion parts are connected with each other to result in the disorder of the periodicity, under the same condition described above.

Particularly, for obtaining the polarization inversion structure of a short period, it is preferred to apply the structure where the length of the conductive portion was made gradually increased from the tip end to the base portion as shown in FIG. 5.

Although the present invention has been described referring to the specific embodiments, the present invention is not limited to the specific embodiments and may be carried out with various modifications and changes without departing from the claims.

The invention claimed is:

1. A method of producing a polarization inversion part by electric field polling process using a comb electrode having a plurality of electrode portions, a feeding portion provided on one surface of a substrate of a ferroelectric single crystal and of single domain, an opposing electrode, and a power source directly connected only to said base portion and said opposing electrode;

wherein said polarization part is produced by an electric field formed from each of said plurality of conductive portions toward said opposing electrode in a "B" direction opposite a polarization axis of said substrate of said ferroelectric single crystal when a voltage is applied between said base portion and said opposing electrode, wherein an optical waveguide is not present in said substrate of said ferroelectric single crystal, wherein said electrode portion comprises a base portion extending from said feeding portion and a plurality of conductive portions separated from said base portion and arranged in series between said base portion and said opposing electrode, and wherein said conductive portion at the tip end of said electrode portion is provided between other conductive portions of said plurality of conductive portions and said opposing electrode, said conductive portion at the tip of said electrode directly opposes said opposing electrode and has a length smaller than the length of the conductive portion nearest to said base portion.

2. A method of producing a polarization inversion part by electric field polling process, the method comprising:

providing a comb electrode having a plurality of electrode portions and a feeding portion on a surface of a substrate of a ferroelectric single crystal and of a single domain, wherein each of said electrode portions comprises a base portion extending from said feeding portion and a plurality of conductive portions separated from said base portion, and wherein adjacent conductive portions of said electrode portions are spaced from one another by a gap of 0.5 microns to 5.0 microns;

providing an opposing electrode on said surface of said substrate, wherein a gap between a tip end portion of said comb electrode and said opposing electrode is greater than said gap between adjacent conductive portions of said electrode portions; and applying a voltage between said comb electrode and said opposing electrode to produce said polarization inversion part.

3. The method of claim 2, wherein said gap between said tip end portion of said comb electrode and said opposing electrode is greater than the length of said electrode portions.

* * * * *